United States Patent  (10) Patent No.: US 7,146,009 B2
Andivahis et al.                  (45) Date of Patent:     Dec. 5, 2006

(54) SECURE ELECTRONIC MESSAGING SYSTEM REQUIRING KEY RETRIEVAL FOR DERIVING DECRYPTION KEYS

(75) Inventors: Dimitrios Emmanouil Andivahis, Reston, VA (US); Shawn Michael Edwards Carnell, Berryville, VA (US); Addison McElroy Fischer, Naples, FL (US); Albert John Wettlaufer, Reston, VA (US)

(73) Assignee: Surety, LLC, Herndon, VA (US)

( * ) Notice: Subject to any disclaimer, the term of this patent is extended or adjusted under 35 U.S.C. 154(b) by 943 days.

(21) Appl. No.: 10/062,551

(22) Filed: Feb. 5, 2002

(65) Prior Publication Data
US 2003/0147536 A1  Aug. 7, 2003

(51) Int. Cl.
H04L 9/00 (2006.01)
H04L 9/08 (2006.01)
H04L 9/30 (2006.01)

(52) U.S. Cl. ...................... 380/277; 380/286; 380/279; 380/282; 380/281

(58) Field of Classification Search ................ 380/279, 380/282, 286, 259, 281; 713/180
See application file for complete search history.

(56) References Cited

U.S. PATENT DOCUMENTS

| | | | | |
|---|---|---|---|---|
| 5,276,737 A | * | 1/1994 | Micali | 380/30 |
| 5,418,854 A | * | 5/1995 | Kaufman et al. | 713/516 |
| 5,436,972 A | * | 7/1995 | Fischer | 380/286 |
| 5,481,613 A | * | 1/1996 | Ford et al. | 380/30 |
| 5,519,778 A | * | 5/1996 | Leighton et al. | 380/30 |
| 5,553,145 A | * | 9/1996 | Micali | 380/30 |
| 5,557,346 A | * | 9/1996 | Lipner et al. | 380/286 |
| 5,557,678 A | * | 9/1996 | Ganesan | 380/282 |
| 5,557,765 A | * | 9/1996 | Lipner et al. | 380/286 |
| 5,623,546 A | * | 4/1997 | Hardy et al. | 713/193 |
| 5,666,414 A |   | 9/1997 | Micali | |
| 5,689,565 A | * | 11/1997 | Spies et al. | 713/189 |
| 5,745,573 A | * | 4/1998 | Lipner et al. | 380/286 |
| 5,748,735 A | * | 5/1998 | Ganesan | 713/165 |
| 5,751,813 A | * | 5/1998 | Dorenbos | 713/153 |
| 5,799,086 A | * | 8/1998 | Sudia | 705/76 |
| 5,838,792 A | * | 11/1998 | Ganesan | 380/282 |
| 5,905,799 A | * | 5/1999 | Ganesan | 380/279 |
| 5,907,618 A | * | 5/1999 | Gennaro et al. | 380/286 |
| 6,009,173 A | * | 12/1999 | Sumner | 713/156 |
| 6,058,188 A |   | 5/2000 | Chandersekaran et al. | |
| 6,084,968 A | * | 7/2000 | Kennedy et al. | 380/259 |

(Continued)

OTHER PUBLICATIONS

International Search Report for PCT/US03/03099 dated May 14, 2003.

*Primary Examiner*—Jacques Louis-Jacques
*Assistant Examiner*—Thomas M Szymanski
(74) *Attorney, Agent, or Firm*—Roberts Mardula & Wertheim LLC

(57) ABSTRACT

A secure electronic messaging system permits communication between registered users, with the assistance of a key server. The system requires a recipient to submit key retrieval information to a key server, and obtain decryption key information. The decryption key information is necessary for the recipient to form the decryption key which is used to read a message encrypted by the sender. The decryption key information may be an encrypted version of a decryption key, or portions thereof, or may be portions of an unencrypted version of a decryption key, among others. Typically, the key retrieval information may either be sent to the recipient by the sender, or may be generated by the recipient, based on information sent by the sender.

10 Claims, 11 Drawing Sheets

U.S. PATENT DOCUMENTS

| | | | |
|---|---|---|---|
| 6,119,227 A * | 9/2000 | Mao ............................ 713/171 |
| 6,160,891 A * | 12/2000 | Al-Salqan ................... 380/286 |
| 6,185,685 B1 * | 2/2001 | Morgan et al. ............. 713/183 |
| 6,249,585 B1 | 6/2001 | McGrew et al. |
| 6,272,632 B1 * | 8/2001 | Carman et al. ............. 713/168 |
| 6,336,186 B1 * | 1/2002 | Dyksterhouse et al. ..... 713/156 |
| 6,377,688 B1 * | 4/2002 | Numao ........................ 380/30 |
| 6,807,277 B1 * | 10/2004 | Doonan et al. ............. 380/281 |
| 6,947,556 B1 * | 9/2005 | Matyas et al. ................ 380/29 |
| 2001/0050990 A1 * | 12/2001 | Sudia ......................... 380/286 |
| 2002/0059144 A1 * | 5/2002 | Meffert et al. ................ 705/51 |
| 2002/0091928 A1 * | 7/2002 | Bouchard et al. ........... 713/178 |
| 2003/0026432 A1 * | 2/2003 | Woodward ................... 380/278 |
| 2005/0138374 A1 * | 6/2005 | Zheng et al. ................ 713/166 |

* cited by examiner

SECURE ELECTRONIC MESSAGING SYSTEM REQUIRING KEY RETRIEVAL FOR DERIVING DECRYPTION KEYS

TECHNICAL FIELD

The present invention is directed to a secure electronic messaging system for a community of users through the auditable use of private/public key pairs.

BACKGROUND OF INVENTION

There are various systems that allow users to securely exchange electronic messages such as e-mail and instant messages. To send Internet e-mail, the sender assembles the message contents, affixes to the message the Internet e-mail addresses of the desired recipient(s), possibly invokes a signing scheme that certifies that the message was composed by the sender and not modified in transit, possibly invokes an encryption scheme that secures access to contents of the message by the recipients only, and transmits the message using the Internet e-mail infrastructure.

To exchange information in an Instant Messaging (IM) system, a user authenticates herself to an IM system, selects the recipient among the available community of users, prepares the message contents, and transmits the message through the IM infrastructure. Encryption services may be provided by the IM service based on the credentials of the authenticated users.

FIG. 1 shows a prior art communication architecture 100 that allows a sender 110 and a recipient 120 to exchange an encrypted message Me over a network 130. In this instance, the sender 110 and recipient 120 are part of a community of users that use public/private key pairs for the purposes of digitally signing and encrypting their communication. The Key Server 140 allows the sender 110 and recipient 120 to obtain other users' public keys and participate in the generation and/or controlled access of symmetric key fragments for a given messaging session. A database 142 associated with the Key server 140 keeps information about the sender and the receiver and the keys that they've used. The network 130 can be a local area net (LAN), a wide area net (WAN), the Internet, or any of a number of other types of communication infrastructures.

SUMMARY OF THE INVENTION

The present invention is directed to a system and method for secure communication of electronic messages and electronic data streams amongst a community of users, in such a way that their use of private/public key pairs for authentication and encryption purposes be recorded and auditable.

In the present invention, the principal entities are a sender, a recipient and a key server. The sender wishes to send an encrypted message to the recipient, and this is facilitated by the key server. The key server sends key retrieval information to the sender. The key retrieval information references decryption information that is required to decrypt an encrypted message. The sender sends the encrypted message and the key retrieval information to the recipient. The encrypted message itself is not sent to the key server. The recipient then sends the key retrieval information to the key server and receives the decryption information in response. The recipient then uses the decryption information to decrypt the encrypted message.

In one aspect of the present invention, the sender of a data message accesses the key server to obtain public key information about the intended recipient of the data message. Either the key server or the sender, or both in cooperation, generate either a symmetric encryption key or an asymmetric encryption key pair. The sender uses the appropriate encryption key to encrypt the data message contents. The decryption key (which is either the symmetric key or the decryption portion of the asymmetric key pair) is split into a first portion and a second portion. The second portion is stored by the key server. The sender forms a transmission package comprising the encrypted data message, the first portion of the decryption key, and key retrieval information for a recipient to obtain the second portion of the decryption key. Optionally, in the transmission package, the first portion of the decryption key and/or the key retrieval information may themselves be encrypted by the recipient's public encryption key. In any event, the transmission package is then sent to the recipient. The recipient unpacks the transmission package, and decrypts the first portion of decryption key and/or the key retrieval information, if needed. The recipient then creates and sends a key retrieval request comprising the recipient's identification information and the key retrieval information to the key server. In response to a proper key retrieval request, the key server returns the second, complementary portion of the decryption key to the recipient. The recipient then combines the first and second portions of the decryption key to decrypt the encrypted data message to access the original data message.

In another aspect of the present invention, the sender does not break up the decryption key into first and second portions. Instead, the sender sends the entire decryption key to the key server, and the key server sends the key retrieval information corresponding to the stored decryption key back to the sender. In this instance, the sender sends only the encrypted data message and the key retrieval information to the recipient, who then sends the key retrieval information to the server to obtain the entire decryption key.

In yet another aspect of the present invention, the key server creates the encryption key, stores the decryption key, and sends the encryption key to the sender, along with the key retrieval information. The sender sends the encrypted data message and the key retrieval information to the recipient, who then sends the key retrieval information to the server to obtain the decryption key.

The present invention is also directed to a message audit system. The key server maintains a database of all transactions associated with each key. A sender, or other authorized entity, is permitted to access transaction information concerning that sender's keys. This permits the sender to view a key transaction log showing the status of the various keys used by that sender. The key transaction log may thus show whether a recipient submitted a key retrieval request to obtain the decryption key information, thereby indicating whether or not the recipient could have read the message. If the key transaction log indicates that the decryption key information corresponding to a transmission package has not yet been retrieved, the sender optionally may effectively cancel the message, by submitting a key-cancellation request which informs the key server to no longer honor the corresponding key retrieval request. This would prevent the recipient from obtaining the decryption key information, and thereby preclude the recipient from ever reading the encrypted message, since the recipient, though it may have the encrypted message, cannot read it since it can no longer obtain the decryption key information necessary to read the encrypted message.

BRIEF DESCRIPTION OF THE DRAWINGS

The present invention is now described with respect to the following detailed description and drawings in which.

DETAILED DESCRIPTION OF THE INVENTION

In the present description, it should be noted that the term 'sender' can refer to either a person, or to the client program which transmits the message, while the term 'recipient' can refer to either the person, or to the client program which receives the message transmitted by the sender. In the present parlance, 'key server' refers to the platform and to the server-end computer program residing thereon, which is programmed to perform the duties associated with such an entity. It is understood that the executable software code comprising the key server, the sender and the recipient may each reside in the computer-readable memory of a general purpose, or other computer, or even a specialized computer. Furthermore, the software can be distributed in any number of forms of computer-readable memory, such from servers on a web site, floppy disks, CD-ROMs, tapes, and the like.

For the purposes of the present disclosure, a sender and a recipient may themselves each be on a separate (or even a common) network having one or more nodes through which the sender or receiver communicates to the outside world Such a network may have, among other things, an Internet gateway, a store-and-forward e-mail server, and other well-known assets.

In the following discussion, various embodiments of a messaging session are presented in which a sender communicates with a recipient via the Internet e-mail infrastructure and communicates with a key server via the HTTP messaging protocol. It should be kept in mind, however, that the system described below is independent of infrastructure and so may operate over a wireless network in addition to, or in conjunction with, any other data carriers. It should also be kept in mind, however, that other communication channels (instant messaging) and other communication protocols (e.g., ftp, TCP-IP) may likewise be used and are contemplated as being within the scope of the present invention.

In the case of e-mail, senders and recipients are used by persons, who interact with software programs called mail user agents (MUAs) to compose and transmit Internet e-mail messages. Accordingly, the computers associated with such users (referred to for convenience as a "sender computer" and "recipient computer") typically are provided with an MUA program along with the necessary means for contacting the Internet e-mail infrastructure. Furthermore, these computers are normally provided with one or more input devices such as a keyboard, a mouse, along with both volatile and non-volatile memories, all as known to those skilled in the art. It should be noted, however, that senders and the recipients may instead be software programs not normally operated by a user, but rather operating in an unattended "server" mode.

First Embodiment

Figure 1:
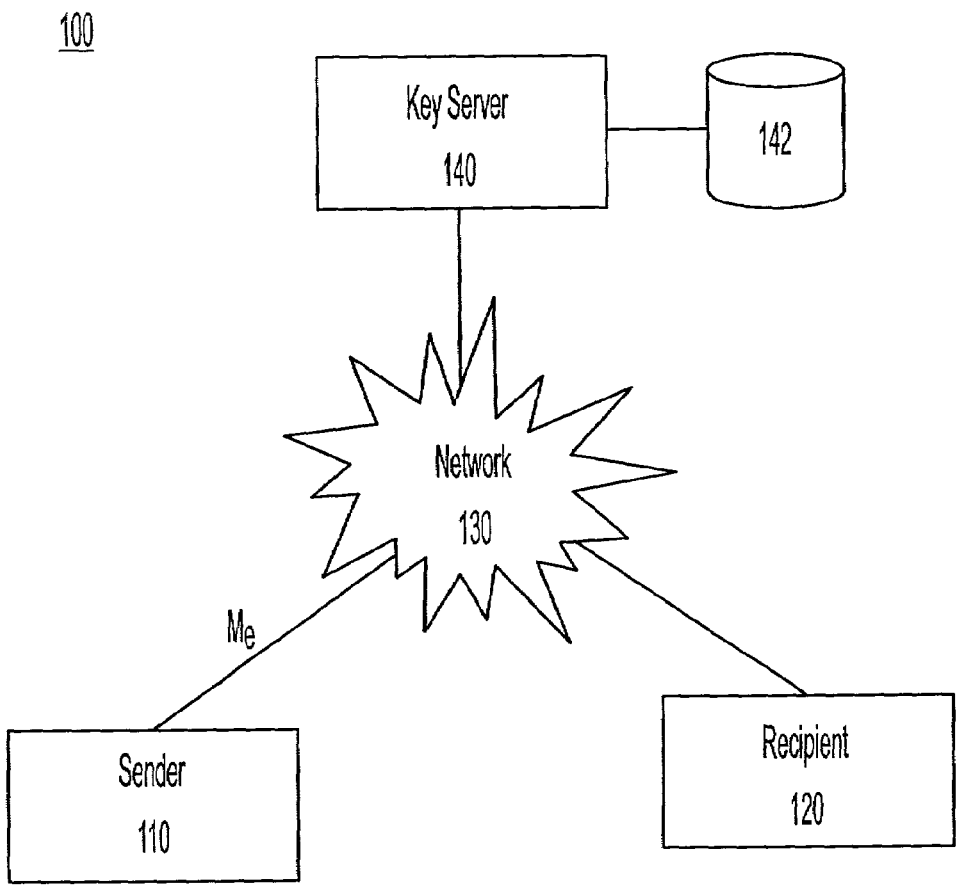
FIG. 1 shows the architecture of a general prior art communication system between a second and a receiver over a network, with the assistance of a key server.
Figure 2:
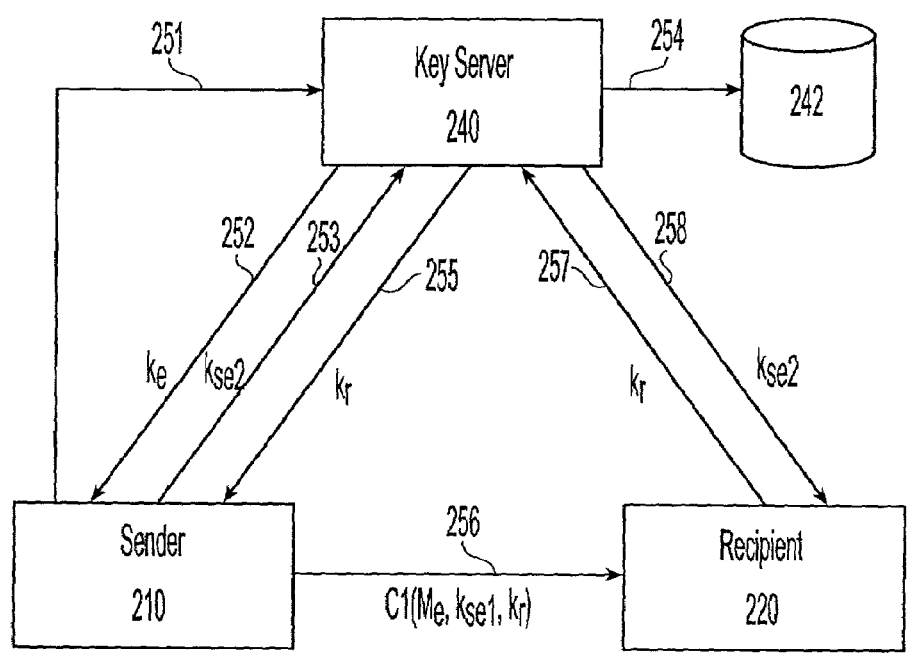
FIG. 2 shows the message flow in accordance with a first embodiment of the present invention.

FIG. 2 presents the message flows 200 in accordance with a first embodiment of the present invention, with reference to a sender 210, a recipient 220 and a key server 240 having an associated memory comprising a database 242. Database 242 stores information about registered users of the system, including their e-mail addresses and their preferred public encryption keys, and also stores key usage information, decryption key information indexed by retrieval information (discussed below), and the like.

Prior to any action depicted in FIG. 2, an authentication process takes place between the sender 210 and the key server 240 to open a connection between the two. For this, the sender sends an authentication request message to the key server and the latter responds with a number of strings of random bits, one such string to be used for each message sent to the key server. The sender then digitally signs each string of random bits as a message is sent, and key server can confirm that that message was sent by the sender. The sender may use any of the well-established, standard signing techniques using a private signing key, for example by digesting and encryption with RSA key pairs. The key server, for its part, may verify the sender's signature by using the sender's public signing key. Henceforth, this type of authentication information is preferably included with each message sent by the sender to the key server.

Figure 5A:
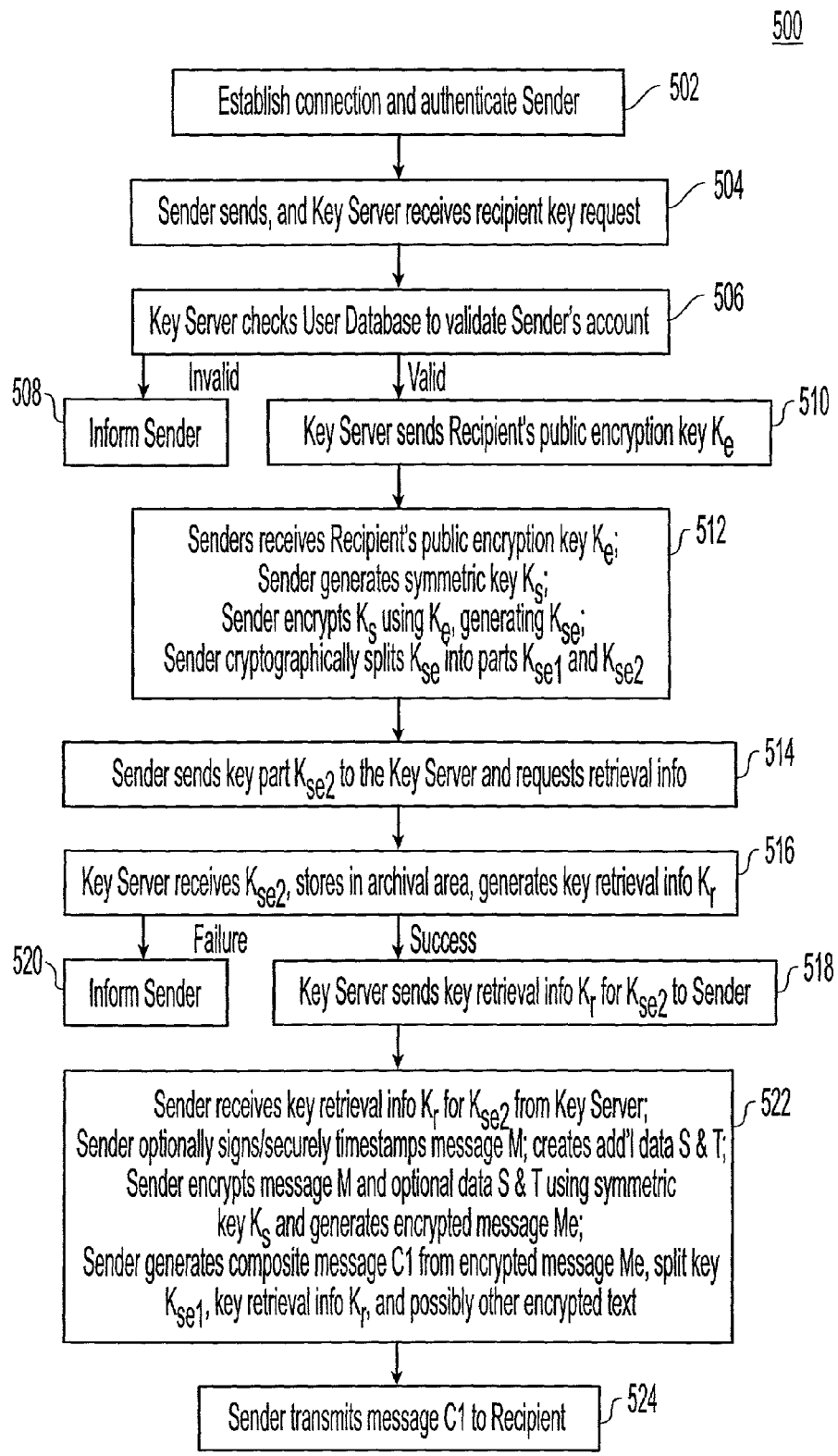
FIGS. 5a & 5b are flowcharts describing the sender's and receiver's actions, respectively, in accordance with the first embodiment of the present invention.

FIG. 5a presents a flowchart 500 illustrating the principal steps experienced by the sender 210 in the first embodiment.

In step 502, the sender and the key server establish a communication link and the sender is authenticated. Authentication may entail, for example, checking the sender's identifying information, such as the sender's e-mail address and making sure that the sender is registered with the system.

In step 504, the sender 210 sends a recipient public key request 251 to the key server 240, and this is received by the server. The recipient public key request preferably includes the authentication information, the sender's identifying information, and a data field comprising a designation of the intended recipient's identifying information (preferably in the form of a recipient's e-mail address). This message 251 requests the recipient's public encryption key. If the e-mail message is to go to more than one recipient, the recipient field includes the e-mail address of each recipient designated in the data field.

In step 506, the key server checks the database 242 to make sure that the sender's 210 account is current. If the sender's account is not current, the key server so informs the sender in step 508.

In step 510, if the sender's account is current, the key server 240 next consults the database to retrieve information about the recipient 220 identified in recipient public key request. The key server 240 then prepares a recipient public key response 252 which preferably includes a message identifier to track the message, a data field comprising the recipient's 220 preferred public encryption key Ke, and related auditing information. If the recipient public key request 251 listed more than one recipient, the data field comprises an array of keys, one for each recipient. The message identifier, however, is uniquely assigned to this message being sent by the sender to the recipient(s). The key server 240 also keeps track of the event—the time at which the sender 210 requested the recipient's 220 public encryption key. Finally, the key server 240 sends the recipient public key response 252 to the sender 210.

It may be possible that a recipient designated by the sender is not registered to use the system. This scenario, with an unregistered recipient, is discussed further below.

In step 512, the sender 210 generates a symmetric key Ks. It should be noted, however, that Ks may have been generated even before the sender sent the recipient public key request to the key server 240. The sender then encrypts symmetric key Ks using the recipient's public encryption key Ke (provided in the recipient public key response) to thereby form Kse, which can only be decrypted by the recipient 220 using the recipient's private decryption key Kd corresponding to the recipient's public encryption key Ke. The sender next cryptographically splits Kse into a first split-key fragment Kse1 and a second split-key fragment Kse2, both of which are required to create Kse. This can be done, for instance by using well-established techniques to form two fragments Kse1, Kse2 which, when XORed together, result in the encrypted symmetric key Kse. If more than one recipient has been designated, this process is done for each such recipient using that recipient's corresponding public encryption key.

In step 514, the sender 210 then sends a key fragment storage request 253 to the key server 240. The key fragment storage request preferably includes the authentication information, the message identifier, the sender's identifying information, a first data field comprising the recipient's identifying information, a second data field comprising the second split-key fragment Kse2 for that recipient, and perhaps also related auditing information. If more than one recipient is involved, then the first and second data fields effective comprise an array mapping each recipient to that recipient's second split-key fragment.

In step 516, the key server 240 sends an archival message 254 to database 242 to store decryption key information comprising Kse2 cross-referenced by recipient's e-mail address and the message identifier. The decryption-key information preferably also is cross-referenced by the sender's identifying information. The key server 240 also generates key retrieval information Kr. The key retrieval information Kr may be in universal resource locator (URL) format, or may be some other identifier which indexes a record comprising at least Kse2. If more than one recipient was designated, this process is performed for each.

In step 518, if the archival storage and the generation of Kr is successful, the key server 240 then sends a key storage response 255 which preferably includes the message identifier and the key retrieval information Kr for retrieving Kse2. If either the archival storage or Kr generation is unsuccessful, an error message is sent to the sender in step 520.

In step 522, the sender 210 receives the key storage response, optionally signs (with the sender's own private signing key) and optionally securely timestamps the original message M, and if applicable, attaches the signature data S and the timestamp data T generated by these two processes. Secure timestamping may be performed in any number of ways, such as those disclosed in U.S. Pat. Nos. 5,136,646 and 5,136,647. The sender's signature data S and the timestamp data T, if present, are appended to the original message and then encrypted together using the symmetric key Ks to form an encrypted message Me. The sender next attaches the first split-key fragment Kse1 and the key retrieval information Kr to the encrypted message Me. The message identifier and additional auditing information may also be attached. This process creates a composite message C1. It should be noted, however, that the encryption step can take place either before or after the key Kse is split, and any time after Ks is generated and the message has been optionally signed and/or securely timestamped.

Finally, in step 524, the sender 210 then transmits the composite message 256 to the recipient 220 using the typical MUA functionality. Alternatively, for security reasons, the encrypted message Me may be sent separately from the remaining data.

Figure 5B:
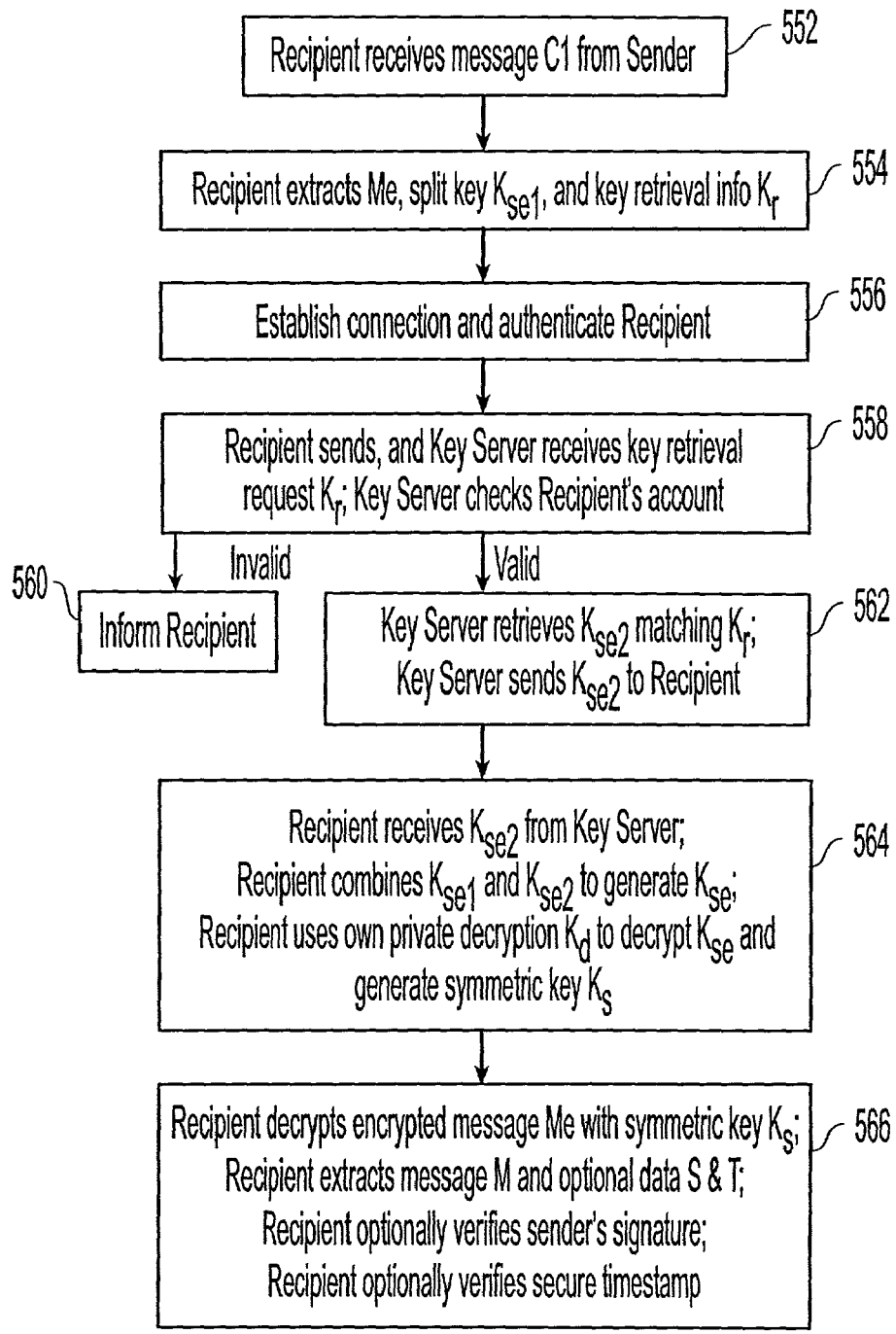

FIG. 5b presents a flowchart 550 illustrating the principal steps experienced by the recipient 220 in the first embodiment.

In step 552, the recipient 220 receives the composite message C1 and in step 554 unpacks' at least the encrypted message Me, the first split-key fragment Kse1 and the key retrieval information Kr.

In step 556, the recipient 220 and the key server 240 establish a communication link and the recipient is authenticated. Authentication may entail, for example, checking the recipient's identifying information, such as the recipient's e-mail address and making sure that the recipient is registered with the system.

In step 558, after authentication, the recipient 220 sends and the key server 240 receives, a key fragment retrieval request 257. The key fragment retrieval request has a number of fields and preferably includes the recipient's authentication information, the message identifier (if received from the sender in the composite message C1), the recipient's identifying information (such as the recipient's e-mail address), the key retrieval information Kr, and perhaps also additional auditing information. It should be noted here that the message identifier and the key retrieval information may be identical, and in such case only one field may be used. If more than one recipient was originally designated, each recipient must independently send such a key fragment retrieval request to be able to read the encrypted message. The key server 240, upon receiving the key fragment retrieval request, first checks to see whether the recipient's account 220 is current, and whether the recipient is entitled to receive the decryption key information. If the recipient's account is not current, the recipient is so notified in step 560.

In step 562, assuming that the recipient's account is current, the key server 240 retrieves the archived second split-key fragment Kse2 referenced by Kr. If the retrieval of Kse2 is successful, the key server 240 then sends a key fragment retrieval response 258 back to the recipient 220 in step 560. The key fragment retrieval response preferably includes the message identifier, the second split-key fragment, and perhaps also auditing information. The key server 240 also updates the database 242 to reflect the fact that the recipient submitted the key retrieval information Kr and was sent the second split-key fragment Kse2. The sender, by logging onto the key server 240, can determine whether the recipient retrieved Kse2 (and therefore presumably was able to read the message). Alternatively, the key server may be set up to automatically send a fax or e-mail to the sender, to notify the sender that the key retrieval information corresponding to one or more of the sender's outgoing encrypted messages, has been presented by a recipient.

In step 564, the recipient 220, upon receiving Kse2 (sent by the key server in the key fragment retrieval response), then cryptographically combines Kse1 (which was in the composite message C1) with Kse2 to re-create Kse. The recipient then decrypts Kse using his own private decryption key Kd, to thereby produce symmetric key Ks.

In step 566, the recipient then uses symmetric key Ks to decrypt the encrypted message Me sent by the sender. In the event that the sender originally appended either signature data S and/or timestamp data T, these can be verified by the recipient in a known manner, which may entail an additional request to key server (such as to obtain the sender's public signing key) or a request to a secure timestamp server for verification of the timestamp data T.

In the first embodiment described above, the key server 240 never has both of the split-key fragments Kse1 and Kse2. Therefore, in the first embodiment, even if the key server 240 were to somehow obtain the encrypted message Me, it could not decrypt the message, since it only has one of the two split-key fragments.

Second Embodiment

Figure 3:
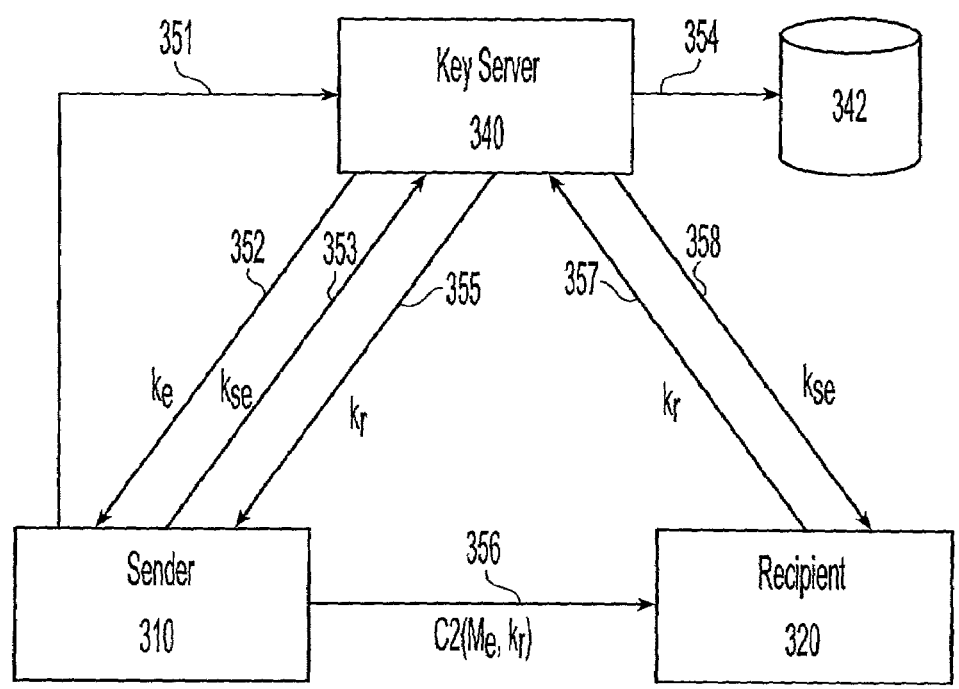
FIG. 3 shows the message flow in accordance with a second embodiment of the present invention.

FIG. 3 presents the message flows 300 in accordance with a second embodiment of the present invention, with reference to a sender 310, a recipient 320 and a key server 340 having an associated memory comprising a database 342. The sequence of messages in this embodiment is substantially the same as in the first embodiment, the principal difference being the content of some of the message flows.

Figure 6A:
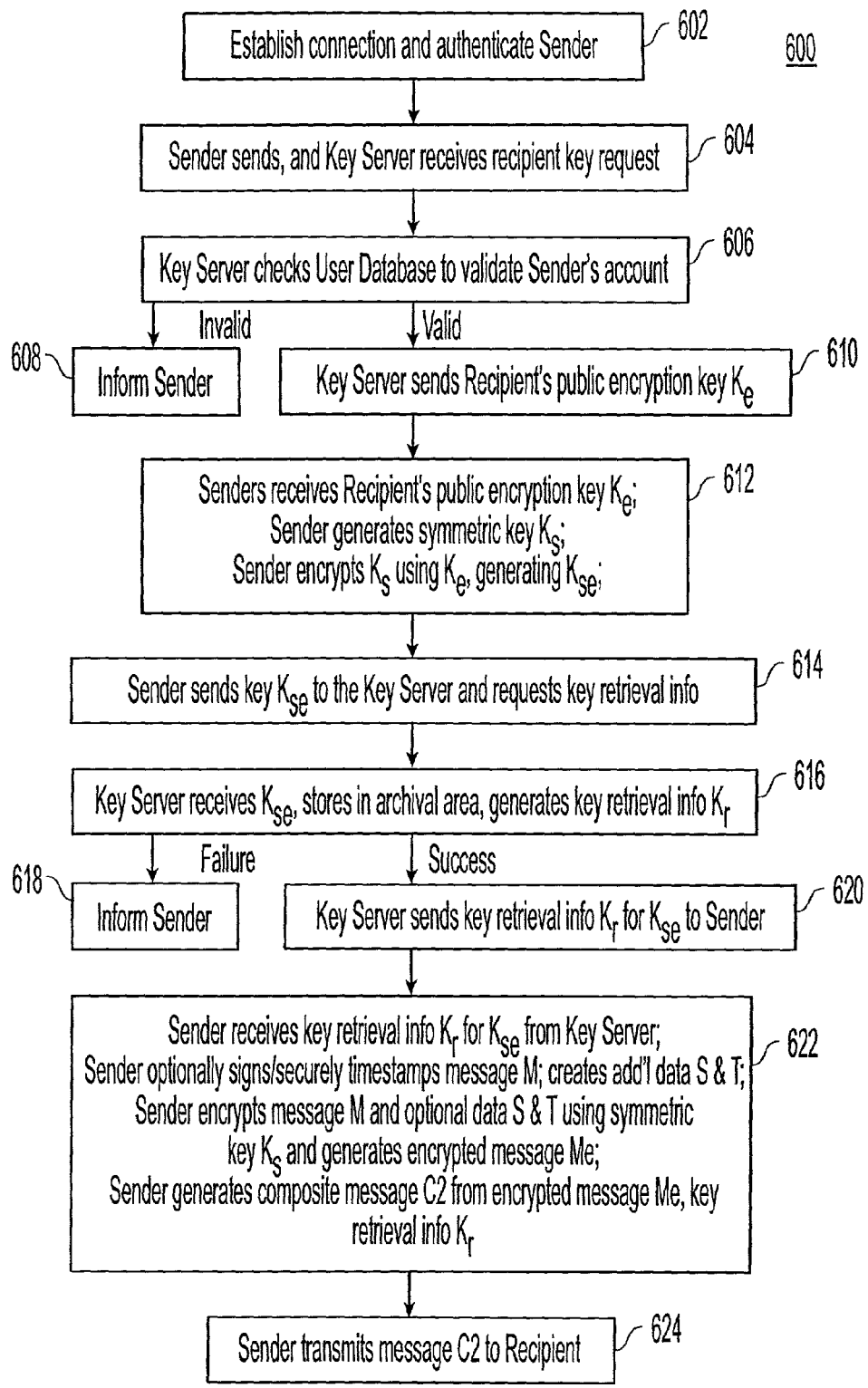
FIGS. 6a & 6b are flowcharts describing the sender's and receiver's actions, respectively, in accordance with the second embodiment of the present invention.

FIG. 6a presents a flowchart 600 illustrating the principal steps experienced by the sender 310 in the second embodiment.

In step 602, the sender 310 and the key server 340 establish a communication link and the sender is authenticated. Authentication may entail, for example, checking the sender's identifying information, such as the sender's e-mail address and making sure that the sender is registered with the system.

In step 604, the sender 310 sends a recipient public key request 351 to the key server 340, and this is received by the key server. The recipient public key request preferably includes the authentication information, the sender's identifying information, and a data field comprising a designation of the intended recipient's identifying information (preferably in the form of a recipient's e-mail address). This message 351 requests the recipient's public encryption key. If the e-mail message is to go to more than one recipient, the recipient field includes the e-mail address of each recipient designated in the data field.

In step 606, the key server 340 checks the database 242 to make sure that the sender's 310 account is current. If the sender's account is not current, the key server so informs the sender in step 608.

In step 610, if the sender's account is current, the key server 340 next consults the database to retrieve information about the recipient 320 identified in recipient public key request. The key server 340 then prepares a recipient public key response 352 which preferably includes a newly created message identifier, the recipient's 320 preferred public encryption key Ke, and related auditing information. The key server 340 also updates the database 342 to include the recipient public key request event.

In step 612, the sender 310 receives the recipient public key response, generates a symmetric key Ks and encrypts the symmetric key Ks using Ke, to thereby produce encrypted symmetric key Kse.

In step 614, the sender 310 then sends a key storage request 353 to the key server. This key storage request, however, includes the entire encrypted symmetric key Kse, instead of just a split-key fragment of the encrypted symmetric key.

In step 616, The key server 340 sends an archival message 354 to database 242 to store decryption key information comprising Kse and generates appropriate key retrieval information Kr. If this process is not successful, an error message is sent to the sender in step 618. If, however, the archival message and the generation of Kr are successful, the key server 340 then sends a key storage response 355 in step 620. The key storage response comprises the message identifier and key retrieval information Kr to the sender 310.

In step 622, the sender 310 optionally signs and/or securely timestamps the original message, and attaches the signature data and/or the timestamp data generated by these two processes, if used, to the original message. The sender then encrypts the original message (along with the signature and/or timestamp data, if present) using the symmetric key Ks to form an encrypted message Me. The sender next attaches the key retrieval information Kr to the encrypted message Me. Additional auditing information may also be attached. This process creates a composite message C2.

Finally, in step 624, the sender 310 then transmits the composite message 356 to the recipient 320 using the typical MUA functionality. Alternatively, for security reasons, the encrypted message Me may be sent separately from the remaining information.

Figure 6B:
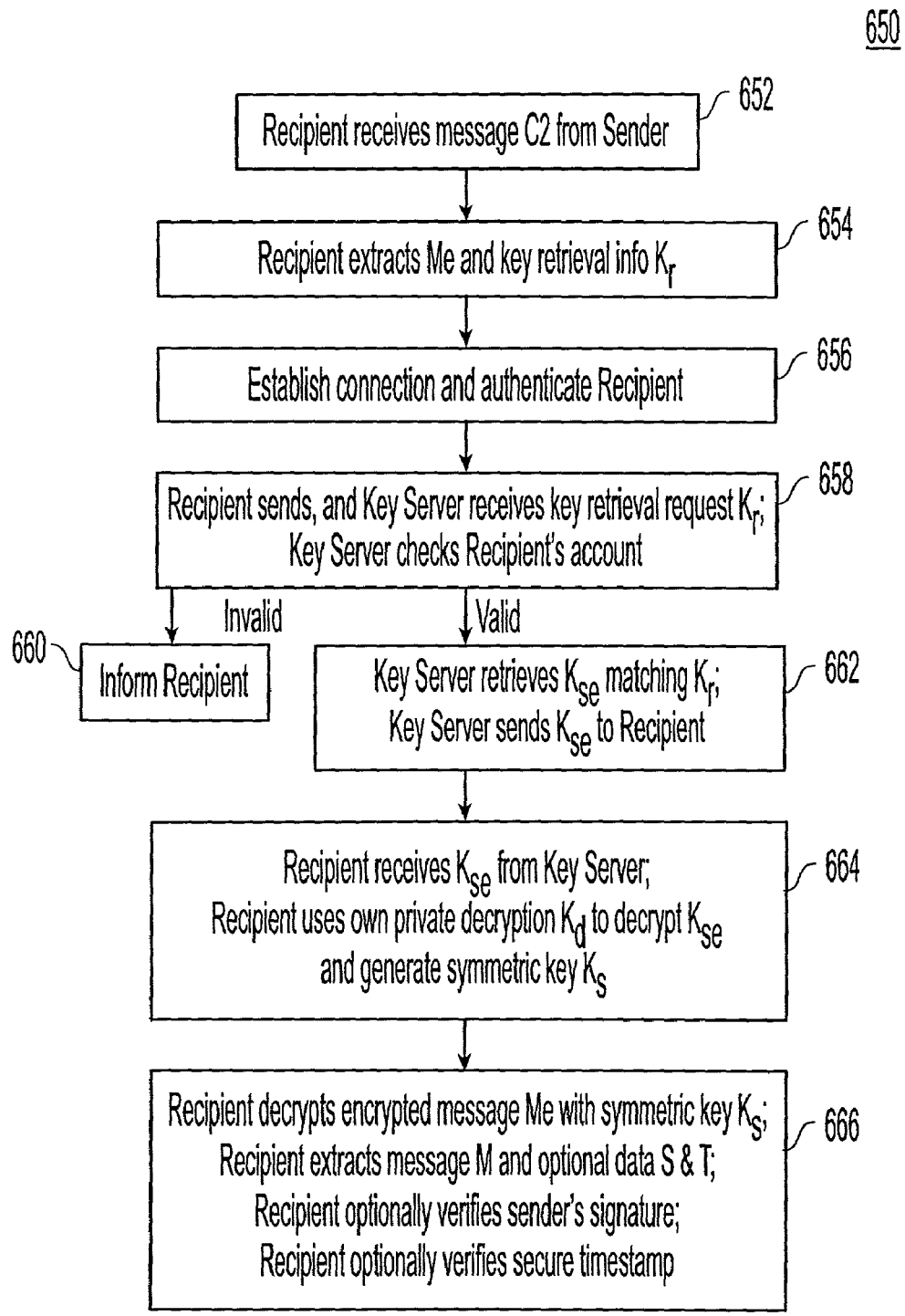

FIG. 6b presents a flowchart 650 illustrating the principal steps experienced by the recipient 320 in the second embodiment.

In step 652, the recipient 320 receives the composite message C2 and in step 654, 'unpacks' it into at least the encrypted message Me and the key retrieval information Kr.

In step 656, the recipient 320 and the key server 340 establish a communication link and the recipient is authenticated. Authentication may entail, for example, checking the recipient's identifying information, such as the recipient's e-mail address and making sure that the recipient is registered with the system.

In step 658, after authentication, the recipient 320 sends and the key server 340 receives, a key fragment retrieval request 357. The key retrieval request preferably includes the authentication information, a message identifier (if sent by the sender), the recipient's identifying information (such as the recipient's e-mail address), the key retrieval information Kr, and perhaps also auditing information. The key server 340 checks to see whether the recipient's 320 account is current and valid. If not, an error message is sent to the recipient 320 in step 660.

In step 662, assuming the recipient's account is current and valid, the key server 340 retrieves the archived encrypted symmetric key Kse referenced by Kr, and sends a key retrieval response 358 back to the recipient 320. The key retrieval response preferably includes the message identifier, the encrypted symmetric key Kse, and perhaps also related auditing information. The key server 340 also updates the database 342 to reflect the fact that the recipient submitted the key retrieval information Kr and was sent the encrypted symmetric key Kse. The sender, by logging onto the key server 340, can determine whether the recipient retrieved Kse (and therefore presumably read the message).

In step 664, the recipient 320, upon receiving Kse from the key server, then decrypts Kse using his own private decryption key Kd, to thereby produce symmetric key Ks.

Finally, in step 666, the recipient may then use symmetric key Ks to decrypt the encrypted message Me sent by the sender. After decryption of Me, the recipient may then verify the signature data S and the timestamp T, if present.

Third Embodiment

Figure 4:
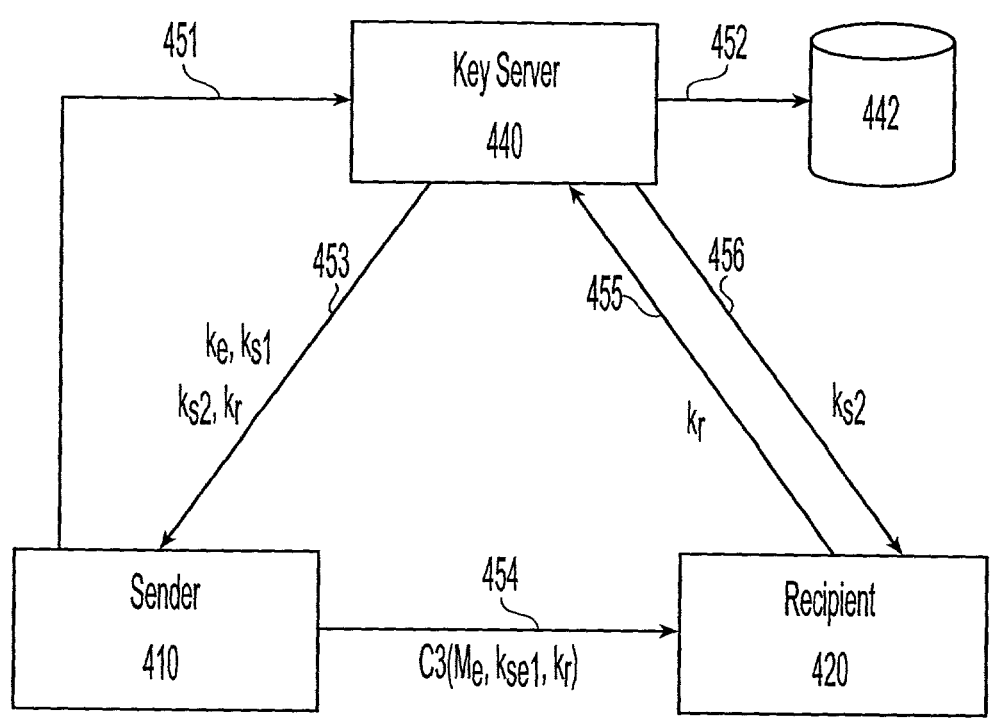
FIG. 4 shows the message flow in accordance with a third embodiment of the present invention.

FIG. 4 shows the message flow 400 for a third embodiment of the present invention, with reference to a sender 410, a recipient 420 and a key server 440 having an associated memory comprising a database 442. The sequence of messages in this embodiment differs somewhat from the corresponding sequences for the first and second embodiments.

Figure 7A:
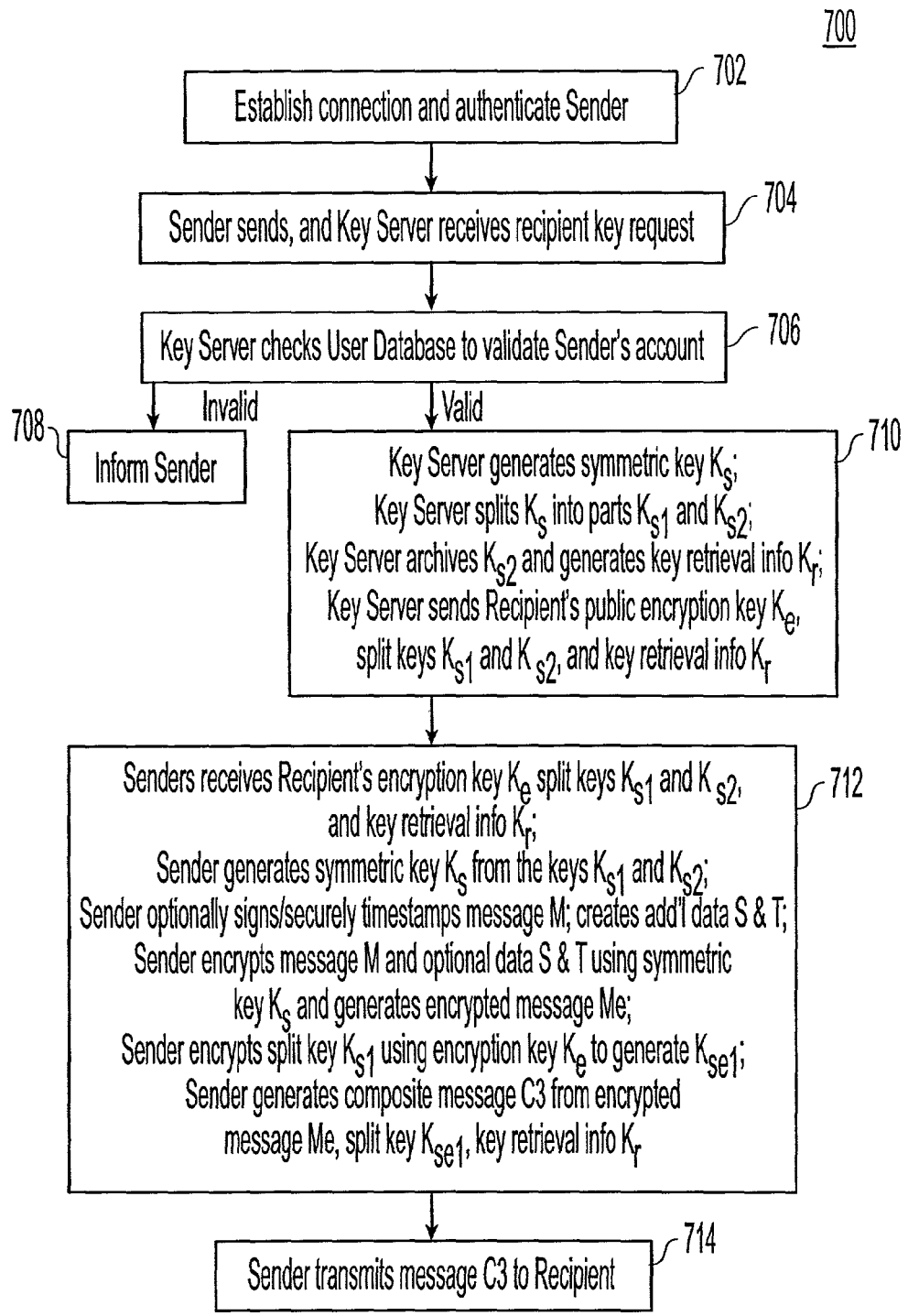
FIGS. 7a & 7b are flowcharts describing the sender's and receiver's actions, respectively, in accordance with the third embodiment of the present invention.

FIG. 7a presents a flowchart 700 illustrating the principal steps experienced by the sender 410 in the third embodiment.

In step 702, the sender 410 and the key server 440 establish a communication link and the sender is authenticated, just as in the above-described embodiments.

In step 704, the sender 410 sends, and the key server 440 receives, the recipient public key request for the intended recipient 420, again, just as in the first and second embodiments.

In step 706, the key server 440 checks to see whether the sender's 410 account is current.

If the sender's account is not current, the key server 440 informs the sender 410 of this in step 708.

In step 710, assuming the senders' account is current, the key server 440 generates a symmetric key Ks and cryptographically splits the symmetric key Ks into two split-key fragments Ks1 and Ks2. The key server 440 then sends an archival message 452 to database 442 to store decryption key information comprising Ks2 (or its encrypted version Kse2 formed with the recipient's public encryption key Ke) and generates appropriate key retrieval information Kr. The key server 440 then sends a key storage response 453 back to the sender. The key storage response preferably comprises a message identifier, the recipient's preferred public encryption key Ke, symmetric key information sufficient to form Ks2, and the key retrieval information Kr, along with additional related auditing information. The symmetric key information preferably comprises both split-key fragments Ks1 and Ks2, although it may simply be Ks2 itself.

In step 712, the sender 410 combines Ks1 and Ks2 to generate Ks. (Alternatively, if the key server 440 sends Ks rather than Ks1 and Ks2 as the symmetric key information, the sender splits Ks in the exact same manner as done by the key server). The sender 410 then optionally signs and/or securely timestamps the original message, and attaches the signature data S and/or the timestamp data T generated by these two processes, if used, to the original message. The sender then encrypts the original message M (along with the signature and/or timestamp data, if used) using the symmetric key Ks to form an encrypted message Me. The sender also encrypts the split-key fragment Ks1 using the recipient's public encryption key Ke to produce the encrypted spilt-key fragment Kse1. Then sender attaches Kse1 and the key retrieval information Kr to the encrypted message Me. The message identifier and additional auditing information may also be attached. This process creates a composite message C3.

Finally, in step 714, The sender 410 then transmits the composite message 454 to the recipient 420 using the typical MUA functionality. Alternatively, for security reasons, the encrypted message Me may be sent separately from the remaining data.

Figure 7B:
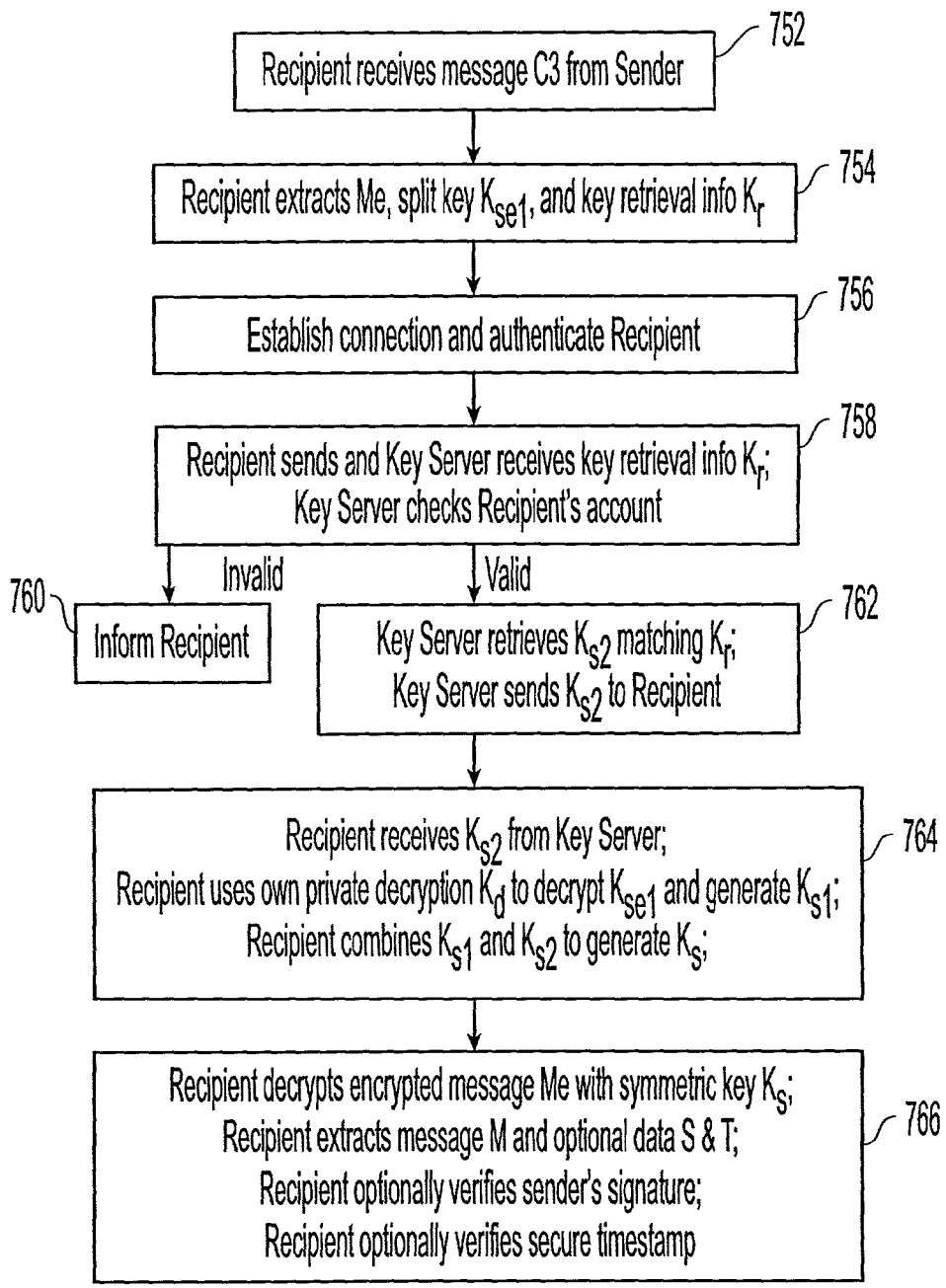

FIG. 7b presents a flowchart 750 illustrating the principal steps experienced by the recipient 420 in the third embodiment.

In step 752, the recipient 420 receives the composite message C3 and in step 754 'unpacks' it into the encrypted message Me, the encrypted spilt-key fragment Kse1, and the key retrieval information Kr.

In step 756, the recipient 420 and the key server 440 establish a communication link and the recipient is authenticated. Authentication may entail, for example, checking the recipient's identifying information, such as the recipient's e-mail address and making sure that the recipient is registered with the system.

In step 758, after authentication, the recipient 420 sends and the key server 440 receives, a key retrieval request 455. The key retrieval request preferably includes the recipient's authentication information, the message identifier (if sent by the sender), the recipient's identifying information the key retrieval information Kr, and perhaps also auditing information. Upon receiving the key retrieval request, the key server 440 checks to see whether the recipient's 420 account is current and valid. If not, a message is sent to the recipient 420 in step 760.

In step 762, assuming the recipient's account is current and valid, the key server 440 retrieves the archived split-key fragment Ks2 (or Kse2) that is referenced by Kr. The key server 440 then sends a key retrieval response 456 back to the recipient 420. The key retrieval response preferably includes the message identifier, the split-key fragment Ks2 (or Kse2), and perhaps also auditing information. The key server 440 also updates the database 442 to reflect the fact that the recipient submitted the key retrieval information Kr and was sent the split-key fragment Ks2 (or Kse2). The sender 410, by logging onto the key server 440, can determine whether the recipient retrieved Ks2 (or Kse2) (and therefore presumably read the message).

In step 764, the recipient 420, upon receiving Ks2 (or Kse2) from the key server, decrypts Kse1 using the recipient's own private decryption key Kd to form Ks1, combines Ks1 with Ks2 (perhaps obtained by first decrypting Kse2 sent by the key server 440) to form symmetric key Ks. Finally, in step 766, the recipient 440 then decrypts the encrypted message Ms using Ks. The recipient may also then verify the signature data and the timestamp, as discussed above.

Comparison of Embodiments

In each of the above-described embodiments, each encrypted message prepared with the mediation of the Key Server results in the key server archiving some information that a recipient must obtain to decrypt the encrypted message. However, the key server never receives the message itself (whether encrypted or not). This not only saves on both bandwidth and storage space at the key server, but also provides the sender and the recipient with a measure of security since the message itself is not provided to an entity having any portion of the keys required to decrypt the message.

In addition, in each of the above embodiments, the sender must use the recipient's public encryption key Ke to encrypt some information derived from the symmetric key Ks. For these purposes, the information derived from the symmetric key Ks may be Ks itself, or the split-key fragments Ks1 and/or Ks2. Furthermore, the recipient must use his private decryption key Kd, in conjunction with some information that the recipient obtains from the key server, to obtain the symmetric key Ks, before the recipient may read the encrypted message Me.

In each of the above-described embodiments, it makes no difference how the sender and recipient are connected. Thus, they may use different Internet service providers and may be in different countries. All that is required is that the sender and the recipient have e-mail addresses, and that they have registered with the key server authority that operates the key server.

Also, while the Key server's principal role is to mediate the encryption and key retrieval process, the Key Server may also place access restrictions upon the key based on user choices or other policies. For example, the user may specify that a key (or key fragment) may not be released until a certain time in the future or should no longer be made available either immediately or at some time in the future. Other policies may release keys based on aspects of either the sender or receiver's account history or current account status; the manner in which, the location from which, or the device with which either party attempts to gain access to the key; or other factors surrounding the transaction. Still other policies may allow for the Key Server to permanently delete a decryption key (or key fragment) from its archival area, rendering the message virtually non-decryptable.

In those instances where the original message is signed by the sender, the signature may be verified by the recipient by requesting the sender's public signing key from the Key Server. And in those instances in which the original message is securely timestamped, appropriate action may be taken by the recipient to verify that the timestamp receipt matches the data that was securely timestamped. The action taken by the recipient depends, of course, on the type of Timestamping protocol used.

The first embodiment of this invention offers the highest degree of security in the communication of messages between sender and recipient. At no time does the key server 240 have access to the encrypted split key Kse1. Furthermore, decryption of the encrypted message requires:
 (1) the encrypted split key Kse2 stored by the key server;
 (2) the contents of the message and its attached encrypted split key Kse1; and
 (3) the recipient's private decryption key Kd;

The second embodiment of this invention offers a fairly strong degree of security. At no time does the key server 340 have access to an unencrypted version of key Kse. Additionally, the decryption of the message requires:
 (1) the encrypted symmetric key Kse stored by the key server (which the key server cannot decrypt);
 (2) the contents of the message; and
 (3) the recipient's private decryption key Kd.

The third embodiment offers a strong degree of security. In this embodiment, the key server generates the symmetric key Ks, so it would be possible for an entity having access to this information to decrypt the encrypted message. Decryption of the message requires:
 (1) the split-key Ks2 stored by the key server (which the key server can use since it also had access to Ks1)
 (2) the contents of the message and the attached encrypted split key Kse1; and
 (3) the recipient's private decryption key Kd.

In instant messaging applications, once users have interacted with the Key Server to establish a symmetric key Ks, they may communicate with each other independent of the Key Server, in a peer-to-peer way if at all possible, using the established key to maintain a secure messaging connection. This reduces the load on channel traffic and also on the demands made on the key server, or another server under the direction of the key server, to conduct an instant messaging session.

Key Retrieval Strategies

In the above embodiments, the key retrieval information is sent by the key server to the sender, for transmission to the recipient. It should be noted, however that the key retrieval information may instead be created by the sender and obtained by the recipient in other ways.

In one set of scenarios, the key retrieval information is created by the sender. One example may be that the sender generates the key retrieval information from the encrypted message, such as by using a hash function, and sending the resulting hash to the key server to be used as an index to the decryption key information. The recipient may obtain the key retrieval information either directly from the sender, or may independently create the key retrieval information by executing the same hash function on the encrypted message received from the sender. As another example, the sender may instead create the key retrieval information from the plaintext message and send the resulting hash to both the key server and the recipient. Yet another example may be that the sender creates a random number to be used as an index, and sends this to both the key server to recipient for use as the key retrieval information. This method risks a very small chance that distinct messages will produce identical random values.

In another set of scenarios, the message ID may be used in combination with other information to index the decryption key information. For instance, combining the message ID with the recipient's e-mail address would be sufficient for use as the key retrieval information. In such case, the key server, upon establishing the message ID and knowing who the recipient is, produces a key retrieval index. The sender, in one of the messages received from the key server, receives the message ID and can formulate the key retrieval information. If the message ID is sent to the recipient in the composite message, the recipient can effectively recreate the key retrieval information, since the recipient obviously knows its own e-mail address. Since each entity can create the key retrieval information by itself knowing nothing more that the message ID and the recipient's e-mail address, there is no need to send the complete key retrieval information from the key server to the sender, or from the sender to the recipient.

What is important in all the scenarios, is that the recipient send some key retrieval information to the key server to receive the decryption key information, in return.

Registration

The present invention contemplates that only users registered with the Key Server or other affiliated entity can send encrypted messages to a recipient. The registration process preferably is accomplished by having a user fill out a registration form posted on a web site associated with the key server. However, various other forms of communication, including telephone or postal delivery, could be used to provide the information required to register. The web-based registration form requests the user to present some personal identifying information to the system so as to set up an account. Preferably, at a minimum, the personal identifying information will include a username and a password. For simplicity, the username can be the user's e-mail address, although this is not a requirement. If a subscription or other user fee is required, the registration process may also request payment information, such as a credit card.

In one embodiment, the true identity of a registered user is not verified. And since e-mail addresses themselves do not always reveal an individual's identify, the present invention enables one to pseudonymously send encrypted e-mail to a recipient whose e-mail address is known. However, as part of the registration process, the system may "authenticate" a user by sending e-mail to the e-mail address that the user has designated. Users must follow the instructions contained in the e-mail, such as by clicking on a URL or going to a webpage and answering additional questions for future identification purposes in order to complete the registration process.

In an alternate embodiment, however, the personal identifying information may be verified. In such case, upon registration, the user may also be asked to supply additional credentials, such as a public key certificate, an ITU X.509 certificate, or the like. Such credentials can then be used in the future to determine which, if any, features of the system, a user may access.

Once the identifying information has been provided, client-side software is then delivered to the user's computer and installed. As part of the installation process, the user will establish a new key pair, Ke, Kd for which only the user will retain possession of the private key Kd while Ke is stored by the key server as being associated with that user. Users may generate new key pairs (Ke, Kd) for use with the system and update the preferred public encryption key Ke registered with the Key Server at any time. Older key pairs preferably are stored locally and may be used to decrypt messages which used the now-defunct public keys for encryption.

During the registration process, the user may also be provided with an opportunity to select certain preferences pertinent to how the user wishes to interact with the Key Server. Included among these are: (1) how the user-sender will be notified of Key Server access by recipients of his messages (e.g., by e-mail or by the user logging onto the web site and looking up the status of the various activities); (2) the privileges that the user would like (e.g., sending messages, receiving messages, or both); and (3) device-related or other policy-related restrictions (e.g. allow for sending encrypted messages from work computer only Monday through Friday between 8 am and 6 pm).

Figure 8:
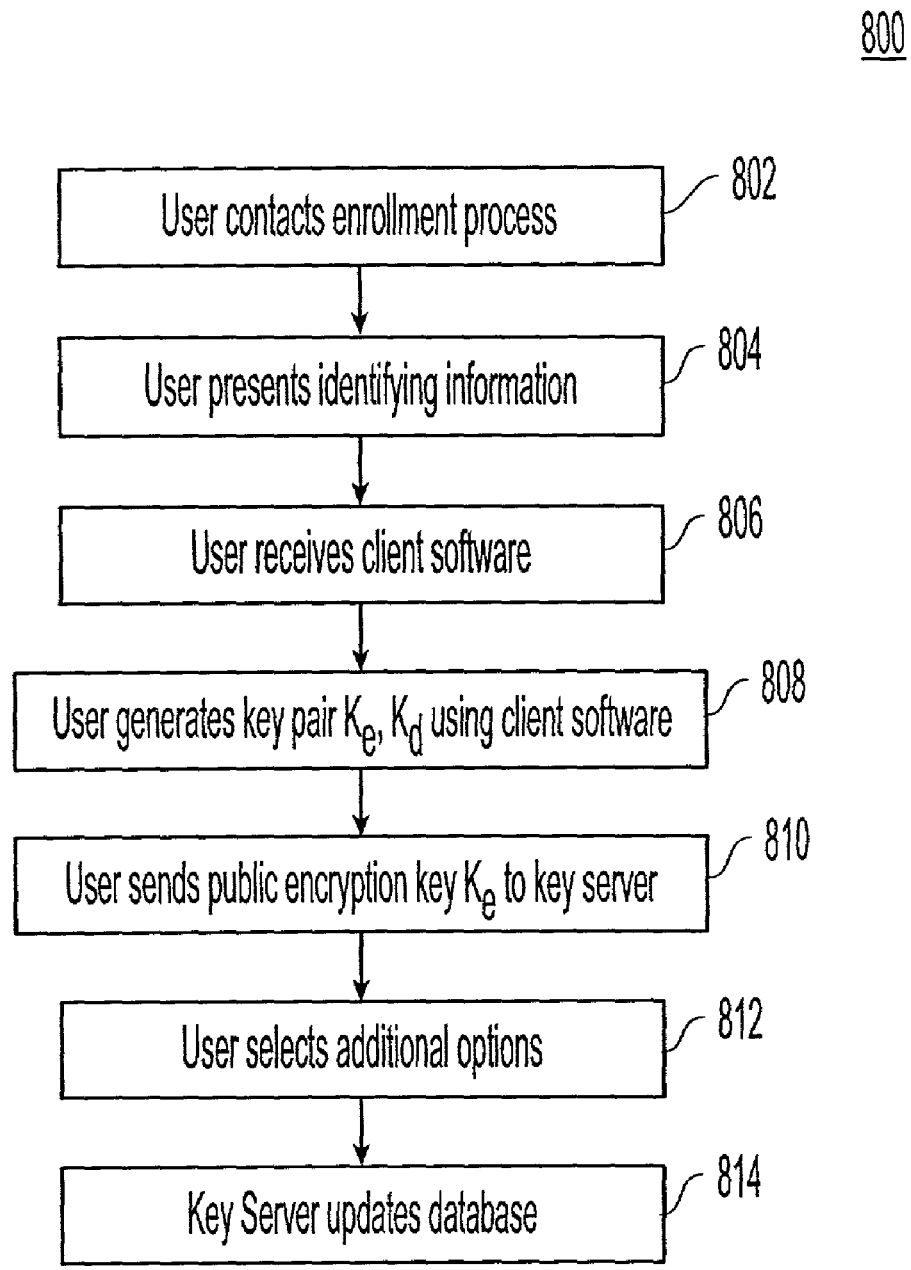
FIG. 8 illustrates the registration process for a new registrant who wishes to register with the system.

FIG. 8 presents a flowchart 800 of the steps for registering a user. In step 802, a user contacts the enrollment process. In step 804, the user presents some number of data items which uniquely identify the user to the enrollment process (for example, a username, the user's full name, phone number, or e-mail address). In step 806, the user downloads and installs the client software. In step 808, the user generates a key pair (Ke, Kd) on their local machine, or alternatively, uses a public key certificate in his possession, such as ITU X.509 certificates or Pretty Good Privacy (PGP) certificates. In step 810, the user submits the public encryption key Ke to the Key Server. In step 812, the user selects additional options. Finally, in step 814, the Key Server updates its database with the new user's information and corresponding credential. Thereafter, the Key Server can use the credential information to determine which registered user has requested a specific encryption or decryption key, and which services that user has requested.

Client-Side Software

The client-side software may be installed from any number of conventional non-volatile memory storage devices such as floppy disks, CD-ROMs, PCMCIA cards, and the like. However, in most instances, it is likely that the client-side software will be obtained from a web site associated with the key server.

The client-side software may comprise a plug-in that cooperates with the user's existing e-mail system. The software installed may act as an extension to an existing Mail User Agent (MUA) or be a self-contained MUA; it may also be some software that can be used in conjunction with an MUA or a Web-based e-mail software. Similarly, in the instant messaging context, the software may be a plug-in to an existing Instant Messaging Agent (IMA) or a self-contained IMA or some software that may be used in conjunction with an IMA.

The process of installing the downloaded software on a user's computer results in a plugin module being installed within the user's MUA clients (for example, Microsoft Outlook, Qualcomm Eudora, and other similar programs) or Instant Messaging clients, as well as new settings being defined within the Operating System environment. Depending on the user's choice, the software may install a self-sufficient MUA client or IM clients.

Another software implementation of this invention may result in software being installed as an extension or a plug-in module within a network's MTA (mail transfer agent), for example, Microsoft Exchange, Lotus Notes, and other similar programs. In such a case, the interaction between the MUA clients and the installed software is governed by the MTA administrator while the role of sender and recipient is carried out by the MTA plugin module.

The client-side software that operates as an MUA extension or other application used to view mail may be configured in a number of ways, depending on the security requirements. Thus, for example, the MUA extension may incorporate a 'one-time-read' feature which restricts the user from copying the message once it has been decrypted and displayed. In such case, the user would not be allowed to save or buffer the message and once the message ceases to be displayed, it becomes non-decryptable and is potentially deleted.

Unregistered Recipients

If the recipient designated by a sender is not a member of the community of users, i.e., is not registered, the key server will not have a public encryption key Ke for that designated recipient. This situation can be handled be either having the server create a temporary key pair for the recipient, or by having the sender create a temporary key pair for the recipient.

If the key server creates the key pair, it performs a few additional steps in its interaction with the sender and the recipient: (1) the Key Server generates a temporary key pair (Ket, Kdt) on behalf of the non-member recipient and this pair is assigned to the e-mail address of the recipient designated in the sender's recipient public key request; and (2) The Key server returns the temporary public encryption key Ket to the sender along with appropriate information denoting that the intended recipient is not registered with the service, and that encryption key Ket was generated not by the recipient but on his behalf. The sender is given the option to continue or cancel the transaction. If he continues, the sender will send a key (or key fragment) storage request to the key server and the key server will respond to the sender with the key retrieval information Kr, as usual.

Instead of having the key server generate the recipient's temporary key pair, this can be done by the sender using the client software resident on the sender computer. The sender may then send the temporary key pair Ket, Kdt to the key server, along with a designation of the recipient's e-mail address to which the temporary key pair corresponds. The key server saves the temporary key pair and transmits it to the recipient when the recipient registers with the service.

As an additional feature, an unencrypted message may be sent to the recipient, advising the recipient about the nature of this encryption service. This unencrypted message may come from the sender, and be automatically included with the encrypted message, for a non-registered recipient. The unencrypted message may include a link which the recipient may click on to begin the registration process. Alternatively, the unencrypted message may come in the form of an e-mail from the key server, advising the first-time recipient that the recipient will receive an encrypted message from the sender, and in order to read the message, the first-time recipient should log onto the web site associated with the key server authority and register as a user.

From the recipient's perspective, the unencrypted message (from either the sender or the key server) directs the recipient to contact the appropriate location where the client software may be downloaded or otherwise obtained. Once the recipient completes the registration process, the temporary key pair (Ket, Kdt) that was used for the encryption of the first received message from the sender is delivered to the recipient and the decryption of the message received is done in the same manner as described above. Thus, in the first embodiment described above, for the initial message, the temporary key pair Ket, Kdt is downloaded and used to decrypt Kse after the first-time recipient receives Kse1 from the sender and retrieves Kse2 from the key server. Thereafter, the recipient becomes a member of the community of users and may create a new key pair (Ke, Kd) for sending and receiving encrypted messages in the future. The registered user retains total ownership of the newly generated private decryption key Kd, while the public encryption key Ke is submitted to the Key Server as the preferred public key for this user.

The key server may re-use temporary key pairs and provide the recipient's temporary public encryption key Ket to other registered users of the service who try to send e-mail to the same recipient BEFORE this recipient registers with the service, letting them know at the same time that they are receiving a temporary public key. Alternatively, new temporary key pairs may be created each time a different sender wishes to send an encrypted message to the same recipient, so long as the recipient has not yet registered and generated its own keys. In this instance, however, the recipient will have to download multiple key pairs when he/she finally registers with the system, before all the received encrypted messages can be read.

It should be noted that, in a less-secure system where it is not as critical that the symmetric key be encrypted for the initial communication between a sender and an unregistered recipient, one may do away with generating key pairs, altogether. The symmetric key Ks would be used for message encryption as before, and everything proceeds as before, with no encryption key Ke or decryption key Kd being used. Thus, in the first embodiment described above, the sender creates Ks and the recipient obtains Ks1 from the sender and Ks2 from the key server; in the second embodiment the recipient obtains Ks from the key server; and in the third embodiment, after the key server generates Ks, the sender sends Ks1 to the recipient while the key server provides Ks2 to the recipient. In all of these embodiments, the recipient need not bother with decrypting anything to obtain the key Ks.

The method described above to handle encrypted messages sent to unregistered recipients could also be used on its own as a general-purpose method to deliver secure messages. However, it is not as secure as the methods described in the embodiments of this invention.

User Credentials

Instead of, or in addition to, simply a username and password, the system may accept a wide variety of credentials from a user. Thus, the system, during registration, may provide a user with the opportunity to specify multiple credentials (ITU X.509 certificates, e-mail addresses, Instant Messaging IDs, credit card numbers, and other contact information), and the user may change those credentials later on, if desired. Credential management is also provided. Thus, a user may securely timestamp the exact time that user claimed a given credential and the exact time they ceased to claim it. This information can then be used as part of an auditing process to further determine the authenticity of a user's credentials. Furthermore, a user may export his or her local credentials (key pairs or ITU X.509 certificates) and settings and then import them into the client software running on another machine.

The credentialing services provided by the system are part of the context through which the broader community of users gains trust in the identity of each user. Access to a user's credentials by other users is controlled, depending on various policies and user preferences. For example, details of some or all of a member's credentials may always be hidden, revealed to only specific members of the community, or published to all.

When a member changes any of his credentials certain other members may be informed of this change either proactively at the time of the change or at some other point in the future. For example, senders who have previously sent a message to a registered recipient will be informed when a recipient's (non-temporary) key pair has changed since the last time the sender sent him or her a message. This serves to inform members that either the recipient has left the service but a new member now inhabits the same e-mail address or that the recipient has not changed but has generated a new key pair for security reasons. Thus, members of the community of users may be notified either passively or actively of changes in the credentials of other members. In addition, a member may specify that he or she is to be warned interactively when sending a message to, or receiving a message from, another member whose credentials are above or below a certain level of security.

In general, however, members may be allowed to attest to the authenticity and strength of their credentials through various means such as key signing (see PGP's "Web of Trust") or other activities by which users can develop a better reputation such as the self-rating system used by the eBay, Inc. online auction community. Community members may also be given the option to provide feedback about a user's identity through other means.

In a preferred embodiment, the system may allow members to attest to the authenticity of other member's credentials when they receive encrypted e-mail from them. For example, a sender may activate an option in the client software requesting that a recipient specifically attest to the sender's identity after having read a message. The recipient will be given the option of either accepting the sender's identity, rejecting it, or ignoring the request. Positive attestations may raise a sender's rating while rejections may lower it. The increase or decrease in a sender's rating may depend on the rating of the recipient doing the attestation.

For example, if member Alice wants to increase her rating in the community of users, she may compose a message to Bob, who is another member in good standing. Before sending the message, Alice activates the option to have Bob attest to her identity. Alice sends her ESP encrypted message to Bob. Bob gets the message, decrypts it, and reads it. Once he closes the message, he's prompted with a dialog advising him that "Alice has requested that you attest to the authenticity of this message. If you believe this message to have come from Alice, please click Yes. If you are reasonably certain that this message is not from Alice, click No. If you'd rather not respond, click Ignore." The client software will report to the server whether Bob clicks "Yes", "No" or "Ignore". As a member accumulates "Yes" clicks, her rating will go up according to some rules that may depend on the rating of the members who responded to the requests for attestation. As a member accumulates "No" clicks, the key server authority may monitor that member's account more closely, re-examine that member's credentials, contact and question the member, or even disable the account and notify past recipients. How aggressively this is done with any given member may be subject to review on a case-by-case basis, although a default, formal policy may be implemented as a baseline for each member.

As a further feature, a member will preferably also be able to report spam. This can be done by such measures as providing a webpage on which a member can provide details, by simply forwarding the spam, or even by building a "spam alert button" into the client softrware. The purpose of this reporting is not to challenge a member's identity but rather to report a member's improper usage of the system.

Key Access Policies

The system may permit policies to be established governing access to the decryption key or key fragment. These policies may be defined by the key server authority, or by an individual community member. For example, a community member may specify that a key (or key fragment) may not be released until a certain time in the future, or should no longer be made available either immediately or at some time in the future. Other policies may also be put into place. For example, these policies may release keys based on aspects of either the sender's or recipient's account history or current account status; the manner in which, the location from which, or the device with which either party attempts to gain access to the key; or other factors surrounding the transaction.

Key Types

The key pairs (Ke, Kd) employed in the above embodiments preferably created using asymmetric encryption algorithms such as the RSA algorithm, the Elliptic Curve algorithms, the El Gamal algorithms, and the DSA algorithms. The symmetric keys Ks employed in the above embodiments preferably are created using symmetric encryption algorithms such as AES, DES, 3DES and the like. All of these are known to those skilled in the art of cryptographic systems.

In the system described above, each member of the community may have a single key pair that is used for both encryption/decryption of keys and signing, or may have two key pairs—a first pair used for encryption/decryption of keys and a second pair used for signing.

As to the encryption and decryption of the messages, it is preferred that a symmetric encryption/decryption key Ks be used. Symmetric keys have obvious computational efficiency advantages, as is known to those skilled in the art. However, it is also possible to use an asymmetric pair of keys—a message encryption key Kme and corresponding message decryption keys Kmd, for the message, instead. Either the key server or the sender, or both in cooperation, may generate an asymmetric encryption key pair. In such case, it is the portion Kmde2 of the encrypted version Kmde of the decryption key Kmd (first embodiment), or the entire encrypted version Kmde of the decryption key Kmd (second embodiment) or the unencrypted portion Kmd2 of the decryption key Kmd (third embodiment), that is stored by the key server and/or sent to the recipient Communication Protocols In all of the above embodiments, the key server preferably communicates with the sender and with the recipient using encrypted communication such as TLS 1.0 or SSLv3, or other appropriate cryptographic protocols. For example, one can circumvent a full SSL-type implementation while still securely sending information to the key server (by either the sender or the recipient) using the key server's public encryption key, perhaps using an X.509 certificate. Similarly, the key server may send information, such as keys, to the sender or recipient using their public encryption keys, which are known to the key server.

Audit Logs

In the above embodiments, the key server logs all transactions related to keys (generation, archival, access), along with sufficient data that identify the accessing computer and user (the latter, perhaps by e-mail address) involved in the action. In addition, the client software on both the sender and recipient machines is configured to log similar information whenever that machine interacts with the Key Server, allowing for a user to cross-check the locally stored log with the log of actions stored by the Key Server. These audit trails can be examined in either a manual mode (user specifically requesting a check) or an automatic mode (client computer and key server talking to each other without specific operator action) and help detect key pair use and misuse, thus strengthening the authority associated with a given key pair after issuance. The frequency and thoroughness of the user's examination of these audit trails can be measured and used as additional evidence of the authenticity and security of the user's key pair. In addition, the key server and the client software could securely timestamp all or a relevant portion of the audit logs themselves, to prevent and detect any tampering.

As an example, the key server may update a first audit log to reflect one ore more of sending an encryption key Ke, storing the decryption key information, and sending the decryption key information to the recipient. Similarly, the sender may update a second audit log to reflect such actions as requesting and/or receiving an encryption key, sending a key or key fragment to the key server for storage, receiving key retrieval information, and sending an encrypted message (and/or the key retrieval information) to the recipient. Subsequently, in either a manual mode, or in an automatic mode, the sender may verify a message audit trail by comparing entries generated by the key server in the first audit log that correspond to messages sent by the sender, with corresponding entries in the second audit log generated by the sender.

A user may examine his or her audit logs and auditable information can be communicated in a number of ways, such as: sending it by e-mail, making the information accessible on a website to an authorized viewer, providing the information via another application, sending the information directly from a server to an MUA for automatic validation, or through other appropriate means.

Any embodiment of this invention generates quasi-unique device identifiers associated with the device used by a user to send or receive messages. These unique identifiers can be used as additional auditable information or as part of a policy to restrict key pair usage to certain devices and during certain periods of time.

While the present invention has been described with reference to certain preferred embodiments, it should be kept in mind that the invention is not limited to these. Variations of the above may well be within the present invention, whose extent is given by the scope of the claims presented below. It should also be kept in mind, that practicing the claimed invention need not necessarily result in any, let alone all, of the advantages and benefits discussed above.

What is claimed is:

1. A method for secure communication of a message M between a sender and a recipient, with the assistance of a key server, the method comprising:
   the sender obtaining a symmetric key Ks and encrypting the message M with the symmetric key Ks thereby forming an encrypted message Me;
   the sender encrypting the symmetric key Ks with a public encryption key Ke associated with the recipient thereby forming an encrypted symmetric key Kse;
   the sender forming first and second split-key fragments Kse1 and Kse2, respectively, from the encrypted symmetric key Kse;
   the sender sending the second split-key fragment Kse2 to the key server;
   the key server storing decryption key information, wherein the decryption key information is formed from the second split-key fragment Kse2, and wherein the decryption key information comprises information needed by the recipient to form a decryption key suitable for decrypting the encrypted message Me, the sender obtaining the key retrieval information Kr, wherein Kr is necessary to permit the recipient to retrieve decryption key information from the key server;
   the sender transmitting to the recipient the encrypted message Me, the first split-key fragment Kse1 and the key retrieval information Kr;
   the recipient transmitting the key retrieval information Kr to the key server and receiving the decryption key information in response thereto;
   the recipient forming the encrypted symmetric key Kse from the first split-key fragment Kse1 and Kse2, Kse2 being derived from the decryption key information;
   the recipient decrypting the encrypted symmetric key Kse with a private decryption key Kd of the recipient thereby forming the symmetric key Ks; and
   the recipient derypting the encrypted message Me with the symmetric key Ks to read the original message M.

2. The method according to claim 1, further comprising adding at least one of signing data and timestamp data to the message M before encrypting the message with the symmetric key Ks.

3. The method according to claim 1, wherein the decryption key information comprises the second split-key fragment Kse2.

4. The method according to claim 1, wherein the sender generates the symmetric key Ks.

5. The method according to claim 1 further comprising, by the sender, establishing at least one policy governing the retrieval of decryption key information.

6. The method according to claim 1 further comprising:
   updating a first audit log at the key server to reflect at least one of storing the decryption key information and sending the decryption key information to the recipient; and
   updating a second audit log at the sender to reflect transmission of a message from the sender to the recipient.

7. The method according to claim 6, further comprising; verifying a correspondence between entries in the first audit log that correspond to messages sent by the sender, with entries in the second audit log.

8. The method according to claim 1 further comprising: the sender requesting that the recipient attest to sender's identity.

9. The method according to claim 1, wherein the sender obtaining the key retrieval information Kr comprises the sender obtaining the key retrieval information Kr through a mechanism selected from the group consisting of obtaining the key retrieval information Kr from the key server and creating the key retrieval information Kr from information available to the sender and the key server.

10. The method of claim 1, wherein the key server generates the symmetric key Ks.

* * * * *